Patented Feb. 28, 1933

1,899,554

UNITED STATES PATENT OFFICE

WILLIAM S. CALCOTT AND WILLIAM A. DOUGLASS, OF PENNS GROVE, NEW JERSEY, AND OLIVER M. HAYDEN, OF WILMINGTON, DELAWARE, ASSIGNORS TO E. I. DU PONT DE NEMOURS & COMPANY, OF WILMINGTON, DELAWARE, A CORPORATION OF DELAWARE

PROCESS FOR COMPOUNDING RUBBER

No Drawing. Application filed December 13, 1927. Serial No. 239,810.

This invention relates in general to the compounding of rubber. More particularly it relates to a method for the preparation of compounding ingredients previous to their incorporation into rubber.

It has been the custom in the preparation of rubber for commercial purposes to add fillers such as zinc oxide, clay, carbon black, etc., as well as sulfur or other vulcanizing agent, together with the accelerators, anti-oxidants, and softeners. The incorporation of these materials into rubber has been accomplished by milling with the plastic unvulcanized rubber. This operation is expensive, and the results as a rule have not been satisfactory, since, even on long milling, the dispersion has not been uniform, while excessive milling materially reduces the quality of the rubber. Various methods have been suggested and practiced by those skilled in the art of rubber compounding. For example, in the mixing of high carbon black content stocks, such as are used for tire treads, stearic acid has been added on the mill to assist in the dispersion. Master batching and high temperature milling are other methods which have been particularly useful.

Loomis and Stump, in U. S. Patent 1,558,688, have described a process which consists in preparing compounding ingredients for subsequent addition to a body of rubber which consists in surrounding and encasing the particles of such ingredients in a thin coating of rubber and then introducing the so treated ingredients into a main body of rubber materials. It is well known that clay is difficult to disperse uniformly in rubber by the ordinary methods, and the method above, as described in U. S. Patent 1,558,688, illustrates one which has been suggested for the improvement of the dispersion. When dry clay which is a typical lyopholic colloid, is suspended in water the particles are reduced to colloidal dimensions. It has been found that the formation of aniline black by the oxidation of aniline results in a surface film on the clay which materially assists in the dispersion of the clay in rubber. Aniline black itself appears to be easily incorporated into rubber and the improvement in dispersion of the treated clay is undoubtedly due to the effect of the surface film.

Bridgwater and Powers, in U. S. Patent 1,628,528, describe a method of uniformly impregnating a mass comprising rubber with a finely divided anti-aging compound, the particles of which tend to adhere, by first effecting an intimate mixture of said compound with a dust adapted to coat the particles thereof and subsequently adding the mixture to the main body of rubber materials. This method consisting in the simultaneous grinding of an anti-aging compound and an inert diluent, appears to largely prevent this aggregation of particles and is consequently a distinct improvement over the use of an anti-aging compound, ground by itself. It has the disadvantage, however, that the reduction in size of the particles is dependent upon the mechanical means employed. A microscopic examination of the material prepared according to the method of Bridgwater and Powers showed that the dispersion was superior to para-amino phenol ground alone, but decidedly inferior to the method in which the particles of para-amino phenol were reduced to colloidal size by precipitation.

This invention has as an object the preparation and conditioning of compounding ingredients to render them more suitable for incorporation into rubber. A further object of the invention is the formation in a colloidal system of colloidal sized particles of the compounding ingredient in the presence of an agent which tends to preserve the colloidal nature of the system. A still further object of the invention is the utilization of an agent for protecting the colloidal nature of the compounding ingredients in the medium in which it is formed that functions as a dispersive and as a protective agent. A final object of the invention is incorporation of the pre-treated compounding ingredient into rubber and the dispersing of the compounding ingredients uniformly throughout the rubber without the necessity of milling.

These objects are accomplished by the following invention in which the various materials to be compounded into rubber are first reduced to particles of colloidal dimensions in the presence of a protective agent which is soluble in rubber at the temperature of milling. This protective agent must obviously function in two media, namely, that in which the reduction in particle size is effected, and in the rubber medium.

Following are specific examples of embodiments of our invention, but it is to be understood that these are illustrative only and are not to be taken as limiting our invention:

*Example 1.*—10.9 grams para-amino phenol were dissolved in 100 cc. water, and 20 cc. of concentrated HCl. This solution of para-amino phenol hydrochloride was added all at once to a suspension of 28.4 grams stearic acid and 200 cc. of water and 25 cc. of concentrated ammonium hydroxide with efficient agitation. After filtering, the material was dried and compounded in the proportion of 1 part of product to 100 parts of rubber. A thin section of this rubber mixtures was examined under the microscope. It was found that the para-amino phenol particles had been reduced to such small dimensions that they were invisible under a magnification of 440 diameters. For comparison, a similar mixture of 1 part of para-amino phenol, which had been ground for 24 hours in a ball mill, in 100 parts of rubber was examined under the same magnification. The mixture prepared according to the last described method contained particles of varying size showing that even this prolonged period of grinding did not result in a sufficient reduction in particle size to permit of good dispersion during the subsequent milling. There was a tendency for the finely ground para-amino phenol to aggregate.

*Example 2.*—As another example illustrating this invention, 100 grams of para-amino phenol were dissolved in 400 cc. of water and 76 cc. of concentrated HCl. This solution was added all at once to a solution of 111 grams of $Na_2S.9H_2O$ in 300 cc. water, to which had been added 29.3 grams sulfur. The precipitate was filtered off, dried, and incorporated into rubber according to the procedure described above. A microscopic examination of thin sections of this rubber showed a considerable improvement in efficiency of dispersion over that of ground para-amino phenol.

*Example 3.*—Meta-toluylene diamine has also been found to disperse poorly in rubber even after prolonged grinding. Fifty grams meta-toluylene diamine, 50 grams glucose, and 30 cc. water were heated with agitation for 30 minutes. During this time practically all of the water which had been added evaporated and the boiling point increased to 126° C. This material was cast, and 1 gram incorporated into 100 grams of rubber by milling. A microscopic examination of a thin section showed no particles visible under magnification of 440 diameters.

*Example 4.*—As another illustrative example, 50 grams m-toluylene diamine and 50 grams stearic acid were melted together and this mixture cooled practically instantaneously in thin layers. Under these conditions meta-toluylene diamine solidified in particles of colloidal dimensions, as shown by a microscopic examination of a thin section of rubber to which 1 part of this material had been incorporated. To illustrate the difference resulting from this pretreatment of the m-toluylene diamine, an equivalent amount of m-toluylene diamine and stearic acid was added separately to the mill. The examination under the microscope indicated that the particles were not reduced in size during the milling.

*Example 5.*—As a further example illustrating the present invention, an alcoholic solution containing 10 grams of tetra-methyl-thiuram-mono-sulphide was added to 40 grams molten stearic acid and 5 cc. concentrated ammonium hydroxide. After the evaporation of the alcohol, and cooling of the mixture a stearic acid-soap mixture was obtained. A thin section of rubber, in which 2.5 grams of this mixture had been milled into 100 grams pale crepe, was compared microscopically with a thin section containing 0.5 gram tetra-methyl-thiuram-mono-sulphide in 100 grams pale crepe. The latter showed the unbroken characteristic crystals of the accelerator while the stearic acid-soap mixture containing the same amount of accelerator showed practically no crystals.

It will be obvious that the process of the invention may be applied to a mixture of one or more anti-aging compounds of the type described. Thus, the use of a colloidal system containing a mixture of phenyl-alpha-naphthylamine and meta-toluyene-diamine together with stearic acid has been found to be of advantage in cases where it is desired to impart to the rubber the peculiar anti-aging properties inherent in each of these substances.

Uniformly and finely divided fillers, reinforcing agents, accelerators and antioxidants have been so generally used by those skilled in the art of rubber compounding that the reasons for the insistance on this fine state of subdivision need not be given here. Many of these materials difficult to disperse by ordinary means have, during some stage of their preparation for use in rubber compounding, existed, or might have been made to exist, as particles of colloidal dimensions. As an example, clay in the presence of water, exists as a colloidal suspension, but on removing the water, the clay loses its colloidal properties. If this dried clay be suspended in benzene, the system has the properties of a coarse mechanical suspension and not those of a colloidal solution or colloidal suspension. If the same clay be again suspended in water, the clay again reverts to colloidal solution. This illustration is given to demonstrate the necessity for the consideration of the effect of the second component of the system upon the colloidal properties of a material. Clay can not be said, therefore, to possess inherently colloidal properties. Reference has been made to the reduction of particles of colloidal dimensions. A colloidal system, as referred to in this patent, may be defined as one containing definite particles, visible under the ultra microscope, which exhibits Brownian movement. The system is sensitive to ions in solution and the apparent solubility depends on the previous history of the sample rather than being a fixed value at a given temperature in a given solute.

The steps involved in the application of this invention are enumerated below:

1. Formation in a colloidal system of colloidal sized particles of a compounding ingredient for rubber in the presence of a dispersing agent which tends to preserve the colloidal nature of the system.

2. Conditioning the compounding ingredient prior to incorporation into rubber, such as drying, etc.

3. Incorporation of the pre-treated compounding ingredient into rubber at which time the agent which protected the colloidal nature of the compounding ingredient in the medium in which it is formed, functions as a dispersive as well as a protective agent.

The term "compounding ingredient" is used above in its broadest sense referring to any material which may be mixed with rubber in making a commercial article and includes the so-called fillers, reinforcing agents, vulcanizing agents, accelerators, and antioxidants.

Any method which will result in the formation of colloidal sized particles will suffice (and the process of accomplishing this is not per se the present invention). For example, the mere agitation of clay with water results in a colloidal suspension. Para-amino phenol, when precipitated from solutions of its salts by alkali under certain carefully controlled conditions, as described in Example 1, forms a colloidal solution in water. Rapid cooling of molten meta-toluylene diamine results in the formation of colloidal sized particles. Grinding of a material in a colloid mill in a suitable medium can also be used.

Atchesons' process for the preparation of colloidal graphite consists of mechanical grinding of graphite in the presence of an agent, tannic acid, which prevents the aggregation of the colloidal particles formed by grinding. The tannic acid functions as a protective agent and does not materially assist in the dispersion which is accomplished by mechanical action.

The distinction between dispersive and protective agents might be more clearly illustrated as follows. Ponsol Blue RP is not oil soluble and it is difficult by ordinary means to incorporate this dye into an oil medium. A colloidal solution of this dye is made in water by any suitable method in the presence of an ammonium soap which stabilizes or protects the colloidal properties of the system. After the removal of the water and elimination of the ammonia from the ammonium soap, there results a product which, when ground in oil, again forms a colloidal solution but in a different medium than that in which it first existed. The stearic acid functions in the oil medium as a dispersive agent as well as a protective agent.

As many apparently widely different embodiments of this invention may be made without departing from the spirit thereof, it is to be understood that we do not limit ourselves to the foregoing examples or descriptions except as indicated in the following patent claims.

We claim:

1. In the method of uniformly distributing compounding ingredients throughout a mass comprising coagulated rubber, the steps which comprise the formation in a colloidal system of colloidal sized particles of the compounding ingredient in the presence of an agent which tends to preserve the colloidal nature of the system and is soluble in rubber, and introducing the ingredients into the rubber material.

2. In the method of uniformly distributing an anti-aging compound throughout a mass comprising rubber, the steps which comprise reducing said compound to particles of colloidal dimensions in the presence of a dispersing agent which is soluble in rubber at the temperature of milling, and introducing the ingredients into the rubber material.

3. In the method of uniformly distributing an anti-aging compound throughout a mass comprising rubber, the steps which comprise reducing the compound to particles of colloidal dimensions in the presence of stearic acid which is soluble in rubber at the temperature of milling, and introducing the ingredients into the rubber material.

4. In the process of preserving a cured rubber composition, the steps which comprise producing a rubber preserving compounding ingredient in the form of particles of colloidal dimensions in the presence of a dispersing and protective agent which is soluble in rubber at the temperature of milling, and then introducing the prepared ingredients into the rubber material.

5. The process of claim 4 in which the dispersing and protective agent is stearic acid.

6. The rubber product having incorporated therein an anti-aging compound which has been reduced to particles of colloidal dimensions in the presence of stearic acid.

7. A compounding ingredient for rubber which comprises a system containing in colloidal form an agent adapted to inhibit the deterioration of rubber and a dispersing agent which is soluble in rubber.

8. A compounding ingredient for rubber which comprises a colloidal system containing an agent adapted to inhibit the deterioration of rubber and stearic acid, said agent having been reduced to particles of colloidal dimensions in the presence of the stearic acid.

9. A compounding ingredient for rubber which comprises meta-toluylene diamine which has been reduced to particles of colloidal dimensions in the presence of stearic acid.

10. A compounding ingredient for rubber which comprises phenyl-alpha-naphthylamine and meta-toluylene-diamine which have been reduced to particles of colloidal dimensions in the presence of stearic acid.

11. The rubber product having incorporated therein meta-toluylene diamine which has been reduced to particles of colloidal dimensions in the presence of stearic acid.

12. The rubber product having incorporated therein phenyl-alpha-naphthylamine and meta-toluylene-diamine which have been reduced to particles of colloidal dimensions in the presence of stearic acid.

13. In the method of uniformly distributing meta-toluylene diamine throughout a mass comprising coagulated rubber, the steps which comprise the formation in a colloidal system of colloidal sized particles of the meta-toluyene diamine in the presence of an agent which tends to preserve the colloidal nature of the system and is soluble in rubber, and introducing the meta-toluylene diamine into the rubber material.

14. In the method of uniformly distributing meta-toluylene diamine throughout a mass comprising rubber, the steps which comprise reducing said meta-toluylene diamine to particles of colloidal dimensions in the presence of a dispersing agent which is soluble in rubber at the temperature of milling, and introducing the meta-toluylene diamine into the rubber material.

15. In the method of uniformly distributing meta-toluylene diamine throughout a mass comprising rubber, the steps which comprise reducing the meta-toluylene diamine to particles of colloidal dimensions in the presence of stearic acid which is soluble in rubber at the temperature of milling, and introducing the meta-toluylene diamine into the rubber material.

16. In the method of uniformly distributing phenyl-alpha-naphthylamine and meta-toluylene diamine throughout a mass comprising coagulated rubber, the steps which comprise the formation in a colloidal system of colloidal sized particles of the phenyl-alpha-naphthylamine and meta-toluylene diamine in the presence of an agent which tends to preserve the colloidal nature of the system and is soluble in rubber, and introducing the phenyl-alpha-naphthylamine and meta-toluylene diamine into the rubber material.

17. In the method of uniformly distributing phenyl-alpha-naphthylamine and meta-toluylene diamine throughout a mass comprising rubber, the steps which comprise reducing said phenyl-alpha-naphthylamine and meta-toluylene diamine to particles of colloidal dimensions in the presence of a dispersing agent which is soluble in rubber at the temperature of milling, and introducing the phenyl-alpha-naphthylamine and meta-toluylene diamine into the rubber material.

18. In the method of uniformly distributing phenyl-alpha-naphthylamine and meta-toluylene diamine throughout a mass comprising rubber, the steps which comprise reducing the phenyl-alpha-naphthylamine and meta-toluylene diamine to particles of colloidal dimensions in the presence of stearic acid which is soluble in rubber at the temperature of milling, and introducing the phenyl-alpha-naphthylamine and meta-toluylene diamine into the rubber material.

In testimony whereof we affix our signatures.

WILLIAM S. CALCOTT.
WILLIAM A. DOUGLASS.
OLIVER M. HAYDEN.